US012676899B2

(12) United States Patent
Salman

(10) Patent No.: US 12,676,899 B2
(45) Date of Patent: \*Jul. 7, 2026

(54) CONTEXT-AWARE SECURITY POLICIES AND INCIDENT IDENTIFICATION VIA AUTOMATED CLOUD GRAPH BUILDING WITH SECURITY OVERLAYS

(71) Applicant: Microsoft Technology Licensing, LLC, Redmond, WA (US)

(72) Inventor: Tamer Salman, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/770,763

(22) Filed: Jul. 12, 2024

(65) Prior Publication Data

US 2024/0364754 A1     Oct. 31, 2024

Related U.S. Application Data

(63) Continuation of application No. 17/479,464, filed on Sep. 20, 2021, now Pat. No. 12,069,101.

(51) Int. Cl.
*H04L 9/40*      (2022.01)
*H04L 29/06*     (2006.01)

(52) U.S. Cl.
CPC ................................. *H04L 63/205* (2013.01)

(58) Field of Classification Search
CPC ....... H04L 63/205; H04L 63/20; H04L 63/14; H04L 63/1408; H04L 63/1416; H04L 63/1425; H04L 63/1433
See application file for complete search history.

(56) References Cited

U.S. PATENT DOCUMENTS

| | | | |
|---|---|---|---|
| 8,881,288 B1 * | 11/2014 | Levy ..................... | G06F 21/577 709/225 |
| 2017/0116021 A1 * | 4/2017 | Miller ................. | G06F 9/45558 |
| 2018/0329958 A1 * | 11/2018 | Choudhury ......... | G06F 16/2456 |

\* cited by examiner

*Primary Examiner* — Edward Zee

(74) *Attorney, Agent, or Firm* — Weaver IP L.L.C.

(57) ABSTRACT

Context-aware security policies and incident identification, via automated cloud graph building with security overlays, are determined and performed by systems and platforms. Graph nodes, of a graph associated with a computing system, that represent resources associated with the computing system and entities associated with the computing system that have respective associations to the resources are generated. Security attributes are determined and assigned to the graph nodes that represent the entities and resources, and static and dynamic connections between the graph nodes are added to the graph. Additionally, possible connections in the graph between the graph nodes are added based on heuristic relational determinations of the graph nodes. From the graph, security incidents and kill chains are identified, context-aware security policies are generated and validated, and scopes and relationships of applications are identified. Accordingly, security actions are taken for the computing system.

20 Claims, 5 Drawing Sheets

Generate graph nodes, of a graph associated with a computing system, that represent resources associated with the computing system and entities associated with the computing system that have respective associations to the resources `402`

Assign determined security attributes to respective graph nodes that represent the entities `404`

Generate static connections in the graph between the graph nodes based at least on metadata of the entities and relationships between the entities `406`

Generate dynamic connections in the graph between the graph nodes based at least on monitored communications between one or more of the resources `408`

Generate one or more possible connections in the system graph between the graph nodes based at least on at least one of: configuration settings of the computing system, or respective heuristic relational determinations of two or more of the graph nodes that include one or more of a graph node tag, a similarity, or a deployment template `410`

Perform a security action for the computing system based at least on a relationship between a set of the graph nodes of the graph `412`

400

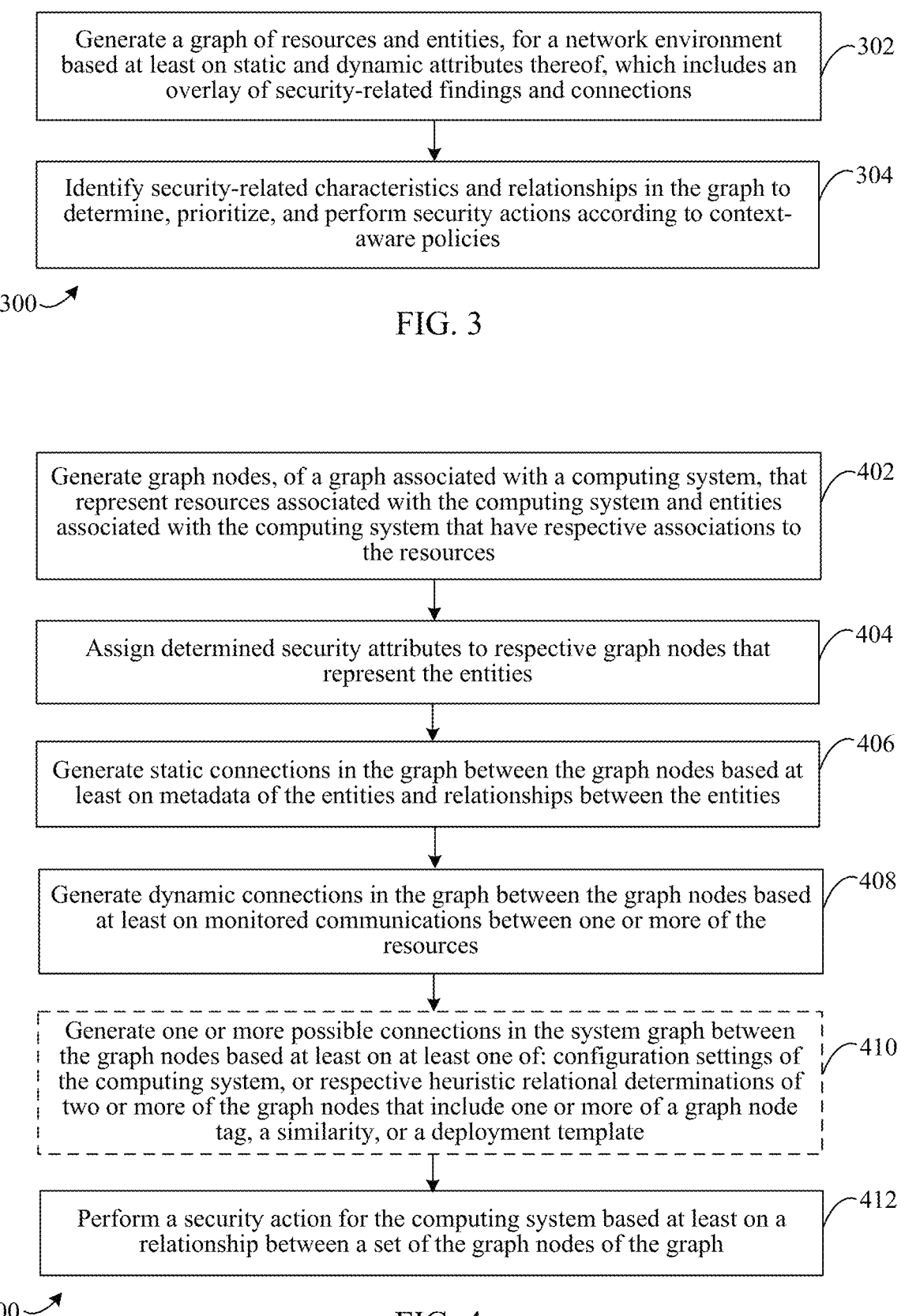

Generate a graph of resources and entities, for a network environment based at least on static and dynamic attributes thereof, which includes an overlay of security-related findings and connections 〜302

Identify security-related characteristics and relationships in the graph to determine, prioritize, and perform security actions according to context-aware policies 〜304

Generate graph nodes, of a graph associated with a computing system, that represent resources associated with the computing system and entities associated with the computing system that have respective associations to the resources 〜402

Assign determined security attributes to respective graph nodes that represent the entities 〜404

Generate static connections in the graph between the graph nodes based at least on metadata of the entities and relationships between the entities 〜406

Generate dynamic connections in the graph between the graph nodes based at least on monitored communications between one or more of the resources 〜408

Generate one or more possible connections in the system graph between the graph nodes based at least on at least one of: configuration settings of the computing system, or respective heuristic relational determinations of two or more of the graph nodes that include one or more of a graph node tag, a similarity, or a deployment template 〜410

Perform a security action for the computing system based at least on a relationship between a set of the graph nodes of the graph 〜412

CONTEXT-AWARE SECURITY POLICIES AND INCIDENT IDENTIFICATION VIA AUTOMATED CLOUD GRAPH BUILDING WITH SECURITY OVERLAYS

CROSS-REFERENCE TO RELATED APPLICATION(S)

This application is a continuation of U.S. patent application Ser. No. 17/479,464, entitled "CONTEXT-AWARE SECURITY POLICIES AND INCIDENT IDENTIFICATION VIA AUTOMATED CLOUD GRAPH BUILDING WITH SECURITY OVERLAYS," filed on Sep. 20, 2021, now allowed, which is incorporated by reference herein in its entirety.

BACKGROUND

Security vulnerabilities for incident monitoring in networks may be identified manually or dynamically in the state of the art. In manual identification practices, network applications may be manually tagged for associations, while dynamic practices only allow for a single-dimension of a network resource type in considerations. Currently solutions do not provide for complete, automated overlays of security issues and attributes across different types of resources in a network, and do not enable the application of additional security findings derived through relationships of different resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Context-aware security policies and incident identification, via automated cloud graph building with security overlays, are determined and performed by systems and platforms. Graph nodes, of a graph associated with a computing system, that represent resources associated with the computing system and entities associated with the computing system that have respective associations to the resources are generated. Security attributes are determined and assigned to the graph nodes that represent the entities and resources, and static and dynamic connections between the graph nodes are added to the graph. Additionally, possible connections in the graph between the graph nodes are added based on heuristic relational determinations of the graph nodes. From the graph, security incidents and kill chains are identified, context-aware security policies are generated and validated, and scopes and relationships of applications are identified. Accordingly, security actions are taken for the computing system.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a flowchart for context-aware security policies and incident identification via automated cloud graph building with security overlays, in accordance with an example embodiment.

FIG. 4 shows a flowchart for context-aware security policies and incident identification via automated cloud graph building with security overlays, in accordance with an example embodiment.

Figure 1A:
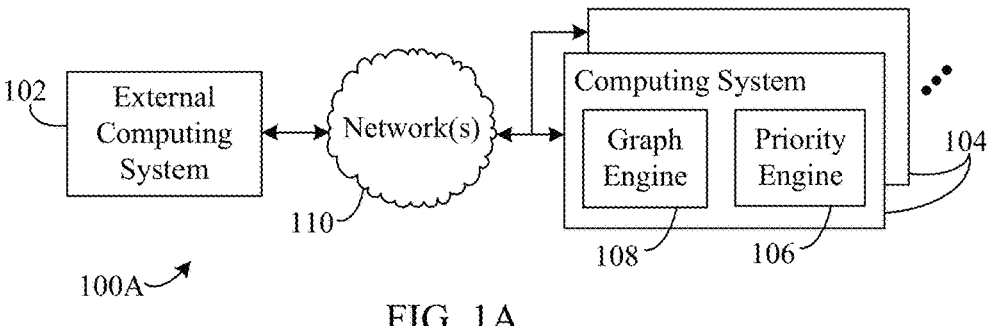
FIG. 1A shows a block diagram of a system for context-aware security policies and incident identification via automated cloud graph building with security overlays, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for context-aware security policies and incident identification via automated cloud graph building with security overlays. Section III below describes example computing device embodiments that may be used to implement features of the embodiments described herein. Section IV below describes additional examples and advantages, and Section V provides some concluding remarks.

II. Example Embodiments for Context-Aware Security Policies and Incident Identification Via Automated Cloud Graph Building with Security Overlays Methods for context-aware security policies and incident identification, via automated cloud graph building with security overlays, are performed by systems and platforms, such as cloud platforms. Accordingly, embodiments herein may be directed to client/user systems, server systems, server clusters, cloud networks, enterprise networks, and/or the like. For instance, embodiments enable the automatic identification of resources and entities of a computing system, e.g., a customer's cloud environment in a cloud-based implementation, which is based on static and dynamic attributes of the resources and entities, and which may be embodied as a system graph. In addition, embodiments provide for overlaying security related findings of the computing system on the entities represented in the graph, as well as the connections between the entities. Still further, additional security findings may be derived in view of these graphical relationships, as described herein.

The generation of a computing system graph, or graph herein, may be performed by a graph engine platform that utilizes monitors in the computing system. These monitors may be configured to determine connections and traffic between entities/resources of the computing system, as well as to identify basic security alerts therein. To build a system graph, in embodiments, graph nodes, of a graph associated with a computing system, which represent resources associated with the computing system and entities associated with the computing system that have respective associations to the resources are generated. A set of graph nodes may be identified through a discovery of computing system resources, e.g., where the computing system environment has read access enabled (as examples: via a subscription, a management group, sets thereof, etc.). Likewise, computing system entities (including, but not limited to, sub-resources, identities, permission, and/or the like) may be identified for respective graph nodes in the graph via discovery.

Security attributes are determined and assigned to the graph nodes that represent the entities and resources based on security-related findings. In embodiments, security attributes may include, without limitation, recommendations on resources, alerts on resources, active users, vulnerabilities, information sensitivity, and/or the like. To further graph node relationships, static and dynamic connections between the graph nodes are added to the graph. Static connections may include established and/or allowed connections, and dynamic connections may include connections through which active traffic is observed. Additionally, possible (or potential) connections (which may be a further type of static connection) in the graph between the graph nodes may be added based on configuration settings of the computing system and/or on heuristic relational determinations of the graph nodes.

From the graph, security incidents and kill chains are identified when security alerts are identified by monitors for a specific resource and/or entity, according to embodiments. For example, one or more monitors may detect a brute force attack on a virtual machine (VM) from a connected public Internet Protocol (IP) address, a suspicious process on the VM, a suspicious login to a database connected to the VM, and data exfiltration from the database. Embodiments provide for these basic alerts to be classified together as a security incident across different resources, rather than individual issues, as the graph provides the connections and relationships that link the alerts in a common context. Similarly, context-aware security policies, including non-localized security policies, may be generated and validated, according to embodiments, allowing for improved contextual security recommendations. As one example, a recommendation may be provided to patch a vulnerability that is exploitable on the server that has the public interface and can connect to the data store with sensitive data (as in the attack described above), and also to fix any high- and medium-severity vulnerabilities, such as those from which sensitive data/information can be exposed, on all resources in the computing system that have a contextually similar path to sensitive information. These paths to sensitive information can be identified and determined as contextually similar based on the graph connections and relationships between graph nodes. Embodiments also provide for the scopes and relationships of applications, such as network applications, in the computing system to be identified. For instance, shared (i.e., contextually related) resources may be determined based on identified applications and their respective scopes. In view of the foregoing, contextually-significant security actions may be taken for the computing system that, in some cases, provide for security policies over diverse portions of the computing system for similar security issues, which is even more significant in large-scale computing systems such as cloud networks.

Accordingly, the embodiments herein provide for solutions to issues associated with simple resource tagging and considerations of single-dimension resource types in determining and acting on security vulnerabilities, and further enable the ability to apply additional security findings derived through relationships of different resources. These and other embodiments for context-aware security policies and incident identification, via automated cloud graph building with security overlays, will be described in further detail herein in association with the Figures, and in the Sections/Subsections of description that follow below.

Systems, devices, and apparatuses may be configured in various ways for context-aware security policies and incident identification, via automated cloud graph building with security overlays. For instance, FIG. 1A is a block diagram of a system 100A, according to embodiments. System 100A is configured for context-aware security policies and incident identification via automated cloud graph building with security overlays, according to embodiments. As shown in FIG. 1A, system 100A includes an external computing system 102 and a computing system 104. In embodiments, external computing system 102 and computing system 104 are enabled to communicate with each other over a network 110. It should be noted that various numbers of computing systems may be present in various embodiments. Additionally, any combination of the components illustrated in FIG. 1A may be present in system 100A, according to embodiments.

Network 110 may comprise any number and/or type of communication links that connect computing devices and hosts/servers such as, but not limited to, the Internet, wired or wireless networks and portions thereof, point-to-point connections, local area networks, enterprise networks, and/or the like.

External computing system 102 and computing system 104 may each comprise one or more server computers or computing devices, which may include one or more distributed or "cloud-based" servers, including being ones of a server cluster. In embodiments, computing system 102 may be a third-party device, including personal devices (e.g., any number, type, or combination of computing devices or computing systems, including a terminal, a personal computer, a laptop computer, a tablet device, a smart phone, a personal digital assistant, a server(s), a gaming console, and/or the like, including internal/external storage devices, etc.), which has a public IP address and are utilized to access, or attempt to access, computing system 104. Computing system 104 may be associated with, or may be a part of, a cloud-based service platform such as Microsoft® Azure® from Microsoft Corporation of Redmond, WA. In some embodiments, external computing system 102 and/or computing system 104 may comprise on-premises computing devices/servers in addition to, or in lieu of, cloud-based servers. Various systems/devices herein, such as computing system 104 may be configured to execute VMs associated with network applications/services that allow for a user to access sensitive information stored by computing system 104.

As illustrated, computing system 104 includes a priority engine 106 and a graph engine 108. In embodiments, priority engine 106 may be configured to identify security incidents and kill chains, generate and validate context-aware security policies, and identify scopes and relationships of applications in computing system 104, one or more of which may enable security actions to be prioritized. In embodiments, graph engine 108 may be configured to generate graphs associated with a computing system and includes graph nodes that represent resources associated with the computing system and entities associated with the computing system that have respective associations to the resources. Graph engine 108 may also be configured to overlay security attributes for graph nodes, generated connections between graph nodes, and/or the like, for performance of security actions, as described herein. Graphs generated by graph engine 108 and information/data generated by priority engine 106 may be stored in a memory of computing system 104. Computing system 104 may also include one or more monitors (not shown for brevity and illustrative clarity), as described herein, to detect active data traffic, security alerts, additions or removal of entities and/or resources, and/or the like.

It should be noted that as described herein, external computing system 102 and/or computing system 104 may be applicable to any type of system for performance of operations for embodiments. One example of implementations noted above are network, or "cloud," implementations, applications, or services in a network architecture/platform. A cloud platform may include a networked set of computing resources, including servers, routers, etc., that are configurable, shareable, provide data security, and are accessible over a network such as the Internet. Cloud applications/services may run on these computing resources, often atop operating systems that run on the resources, for entities that access the applications/services, locally and/or over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run the VMs described herein (emulated computer systems, including operating systems) for tenants. A hypervisor may present a virtual operating platform for tenants, according to embodiments. Hypervisors herein may use a virtualized security mode (VSM) in which generated encryption keys are tied to a trusted computing base (TCB) of the system.

Figure 1B:
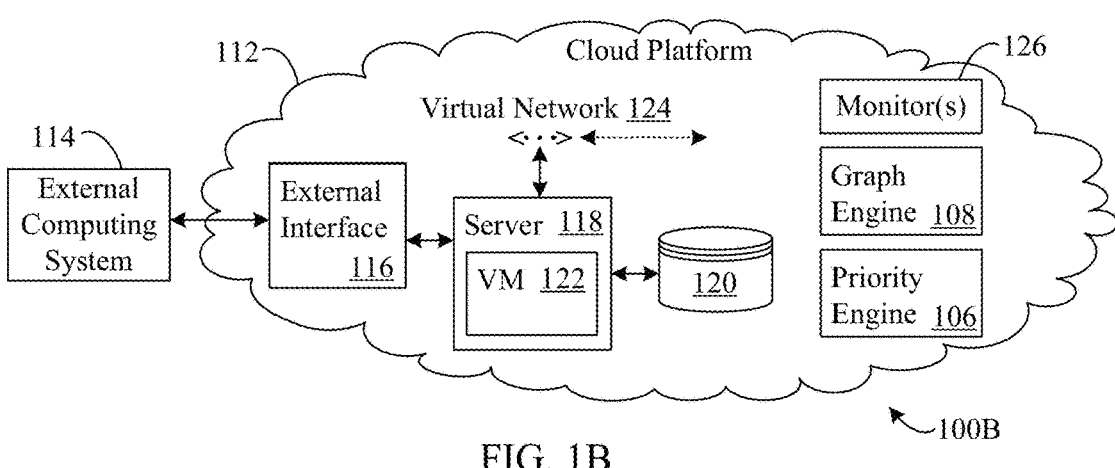
FIG. 1B shows a block diagram of a system for context-aware security policies and incident identification via automated cloud graph building with security overlays, according to an example embodiment.

For instance, referring now to FIG. 1B, a block diagram of a system 100B is shown, according to embodiments. System 100B is configured for context-aware security policies and incident identification, via automated cloud graph building with security overlays, and is illustrated as an embodiment of system 100A of FIG. 1A. As shown in FIG. 1B, system 100B includes a cloud platform 112 in place of computing system 104 described above for system 100A. It should also be noted here that various numbers of components for cloud platform 112 may be present in various embodiments. Additionally, any combination of the components illustrated in FIG. 1B may be present in system 100B, according to embodiments.

While not extensively shown or described for brevity and illustrative clarity, cloud platform 112 may comprise any number and/or type of internal communication links and/or computing/routing hardware that connect computing devices and hosts/servers, etc., such as, but not limited to, wired or wireless networks and portions thereof, point-to-point connections, routers, switches, and/or the like. Additionally, as an example, an external interface 116 as shown may include a network adapter by which one or more components of cloud platform 112 communicate electronically, e.g., over the Internet, to external systems and devices, such as an external computing system 114. External computing system 114 in FIG. 1B may be an embodiment of external computing system 102 of FIG. 1A, as described above, and may represent one or more external computing systems and/or computing devices.

A server 118 is an example of a component of cloud platform 112 that may be communicated with via external interface 116. Server 118 is illustrated as executing, or being configured to execute, a VM 112. VM 112 may be associated with a network application(s) and/or service(s) (including microservices) of cloud platform 112 for which a user may have a subscription or access. Such access may include reading or writing of data/information in a data storage 120, which may include sensitive information/data requiring a login associated with a user identity and access credentials.

VM 122 may connect to other components of cloud platform 112 via a virtual network 124 (which may include communicating via a subnet, not shown). Virtual network 124 may communicate with other virtual networks of cloud platform 112 in which other servers may execute other VMs associated with other network applications and/or services (including microservices). In other words, it is contemplated herein that any number of resources such as virtual networks, and associated servers, VMs, data stores, etc., and any number of servers, VMs, etc., may be located in a given virtual network.

Additionally, cloud platform 112 includes priority engine 106 and graph engine 108, as described above for system 100A of FIG. 1A. In embodiments, priority engine 106 and graph engine 108 may be hosted or executed by one or more servers of cloud platform 112 which may be within a virtual network(s). Graphs generated by graph engine 108 and information/data generated by priority engine 106 may be stored in a memory of cloud platform 112.

As shown, cloud platform 112 includes a monitor(s) 126, which may be an embodiment of the monitors described with respect to system 100A of FIG. 1A. Monitor(s) 126 may be implemented in any way, such as by servers, routers, switches, other hardware utilized to implement in a cloud platform, etc., as would be understood by persons of skill in the relevant art(s). In cloud-based embodiments, any number of monitor(s) 126 may be utilized to monitor for active traffic, security alerts, etc., for a cloud platform, which provide data/information to priority engine 106 and graph engine 108 in the performance of embodiments herein for context-aware security policies and incident identification via automated cloud graph building with security overlays.

Figure 2:
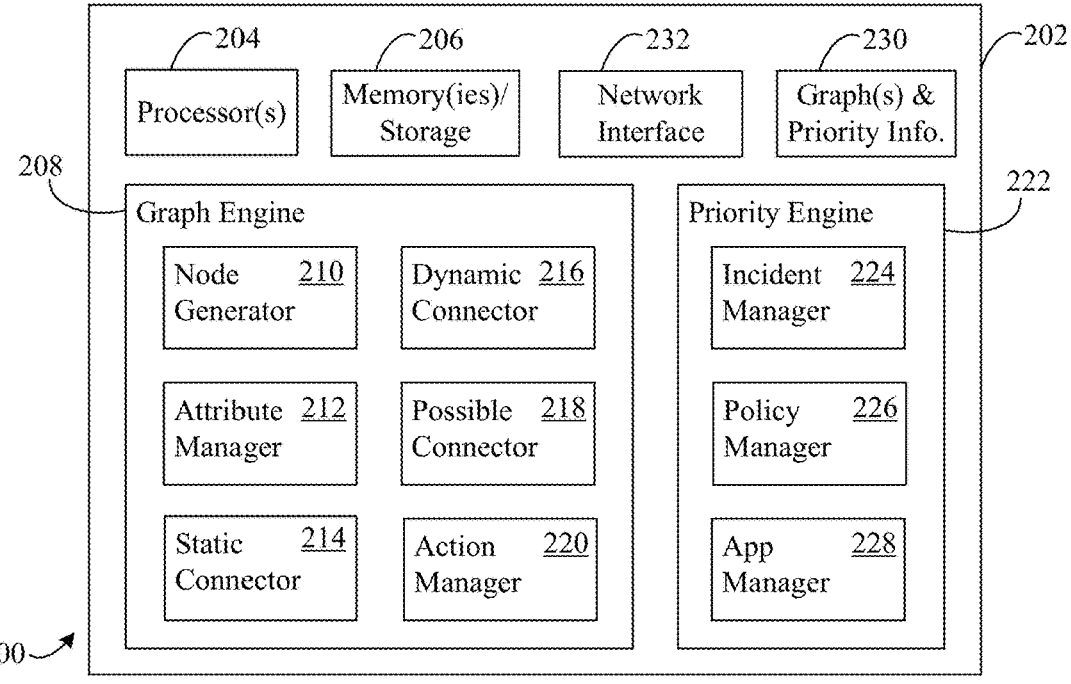
FIG. 2 shows a block diagram of a computing system configured for context-aware security policies and incident identification via automated cloud graph building with security overlays, according to an example embodiment.

Referring now to FIG. 2 and FIG. 3, computing system 104 and/or cloud platform 112 may be configured in various ways for context-aware security policies and incident identification via automated cloud graph building with security overlays. For instance, FIG. 2 shows a block diagram of a system 200, and FIG. 3 shows a flowchart 300, according to example embodiments for context-aware security policies and incident identification via automated cloud graph building with security overlays. System 200 may be an embodiment of system 100A of FIG. 1A and/or system 100B of FIG. 1B, e.g., a server of computing system 104 and/or cloud platform 112. System 200 and flowchart 300 are described as follows.

System 200 includes a computing device 202, which may be an embodiment of a server of computing system 104 and/or cloud platform 112, for which may be any type of server or computing device, as mentioned elsewhere herein, or as otherwise known. As shown in FIG. 2, computing device 202 may include one or more processors ("processor") 204, one or more of a memory and/or other physical storage device ("memory") 206, as well as one or more network interfaces ("network interface") 232. Computing device 202 includes a graph engine 208 that may be an embodiment of graph engine 108 described for FIGS. 1A and 1B, and a priority engine 222 that may be an embodiment of priority engine 106 described for FIGS. 1A and 1B. Computing device 202 may also include or be configured to execute one or more software applications (not shown for brevity and illustrative clarity, and similarly, a hypervisor as described herein, in embodiments. These components of system 200 may be configured for context-aware security policies and incident identification via automated cloud graph building with security overlays, as described herein.

System 200 may also include additional components (not shown for brevity and illustrative clarity) including, but not limited to, components and subcomponents of other devices and/or systems herein, as well as those described below with respect to FIGS. 8 and 9, such as an operating system, etc.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories (including cache memories), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of graph engine 208 and/or priority engine 222, including one or more of the components thereof as described herein, some or all of which may be implemented as computer program instructions, as described herein.

Memory 206 may include volatile storage portions such as a random access memory (RAM) and/or persistent storage portions such as hard drives, non-volatile RAM, and/or the like, to store or be configured to store computer program instructions/code as described herein, as well as to store other information and data described in this disclosure including, without limitation, embodiments of graph engine 208, priority engine 222, and/or the like. In embodiments, memory 206 may comprise secure or restricted portions of memory in which VM 208, one or more applications, a hypervisor, and/or the like, are executed by processor 204.

Network interface 232 may be any type or number of wired and/or wireless network adapter, modem, etc., configured to enable system 200, including computing device 202, to communicate with other devices and/or systems over a network and/or a cluster communication infrastructure, as described herein.

Graph engine 208 is configured to configured to generate graphs associated with a computing system and includes graph nodes that represent resources associated with the computing system and entities associated with the computing system that have respective associations to the resources. Graph engine 208 is also configured to overlay security attributes for graph nodes, generated connections between graph nodes, and/or the like, for performance of security actions. Graph engine 208 includes a node generator 210 configured to generate the graph nodes, and an attribute manager 212 configured to identify and assign security attributes to the graph nodes. Graph engine 208 also includes a static connector 214 configured to generate static connections between graph nodes, a dynamic connector 216 configured to generate active connections between graph nodes, and a possible connector 218 configured to generate possible or potential connections between graph nodes that have not yet been established but are not prohibited or blocked. Graph engine 208 further includes an action manager 220 configured to perform or take security actions for a computing system based on the generated graph and other factors described herein. Additional details regarding graph engine 208 and its components are provided herein with respect to other Figures.

Referring also now to FIG. 3, flowchart 300 begins at step 302. In step 302, a graph of resources and entities is generated, for a network environment based at least on static and dynamic attributes thereof, which includes an overlay of security-related findings and connections. As described above, graph engine 208 is configured to generate a graph with graph nodes representing entities and resources of a computing system. Graph engine 208 may generate such a graph to include connections between graph nodes (e.g., static, dynamic, and possible connections) as well as overlays of security attributes for respective ones of the graph nodes in the graph.

Referring back to FIG. 2 and system 200, priority engine 222 is configured to perform operations to identify and/or generate additional security findings derived through relationships of different resources, security alerts, etc. Priority engine 222 includes an incident manager 224 configured to identify security incidents and kill chains, a policy manager 226 configured to generate and validate context-aware security policies that may include non-localized security policies which pertain to different numbers and/or types of entities/resources, and an application ("app") manager 228 configured to identify scopes and relationships of applications in a computing system. Priority engine 222 is thus enabled to identify incidents, generate context-aware policies that may be non-localized, and identify application relationships, one or more of which may enable prioritization of security actions to be taken by action manager 220.

Referring now again to FIG. 3 and flowchart 300, in step 304, security-related characteristics and relationships in the graph are identified to determine, prioritize, and perform security actions according to context-aware policies. As described above, priority engine 208 is configured to perform operations to identify and/or generate additional security findings derived through relationships of different resources, security alerts, etc., for a computing system, such as security-related characteristics and relationships in the graph. Priority engine 208 may utilize incident manager 224, policy manager 226, and app manager 228 to perform these operations as described. Action manager 220 may then utilize the results of such operations to prioritize security actions undertaken for a computing system.

Referring back to FIG. 2, system 200 also includes graph(s) and priority information 230 which may include any graphs generated, updated, maintained, etc., by graph engine 208, as well as and information/data generated by priority engine 222 (e.g., but without limitation, identified security incidents and kill chains, generated and validated context-aware security policies, identified scopes and relationships of applications, etc.) for a computing system such as, but not limited to, a server, server cluster, cloud platform, enterprise network, other type of computing system, and/or the like, that comprises system 200. That is, in embodiments, system 200 may be a portion of a computing system for which context-aware security policies and incident identification, via automated cloud graph building with security overlays, are determined and performed, but in other embodiments, system 200 may be a separate from such a computing system. Moreover, system 200 may include itself in a generated graph as a graph node therein, according to embodiments. While exemplarily shown separately for visualization and understanding, graph(s) and priority information 230 may be maintained/persisted in memory 208, described above.

Additionally, while shown separately for illustrative clarity, it should be noted that embodiments contemplate one or more of the components of computing system 200 of FIG. 2, e.g., graph engine 208 and priority engine 222, being combined together and/or as a part of other components of system 200. In some embodiments, less than all of the components of computing device 202 as illustrated may be included. In software implementations, one or more components of computing device 202 may be stored in memory 206, and may be executed by processor 204 to perform their described functions and operations. Further details regarding computing device 202, and its components/subcomponents, are described below.

As noted above for FIG. 1A, FIG. 1B, FIG. 2, and FIG. 3, embodiments herein provide for context-aware security policies and incident identification via automated cloud graph building with security overlays. System 100A of FIG. 1A, system 100B of FIG. 1B, and system 200 of FIG. 2, may each be configured to perform such functions and operations, according to embodiments. FIG. 4, FIG. 5, FIG. 6, and FIG. 7 are now described below with reference to these systems.

Figure 5:
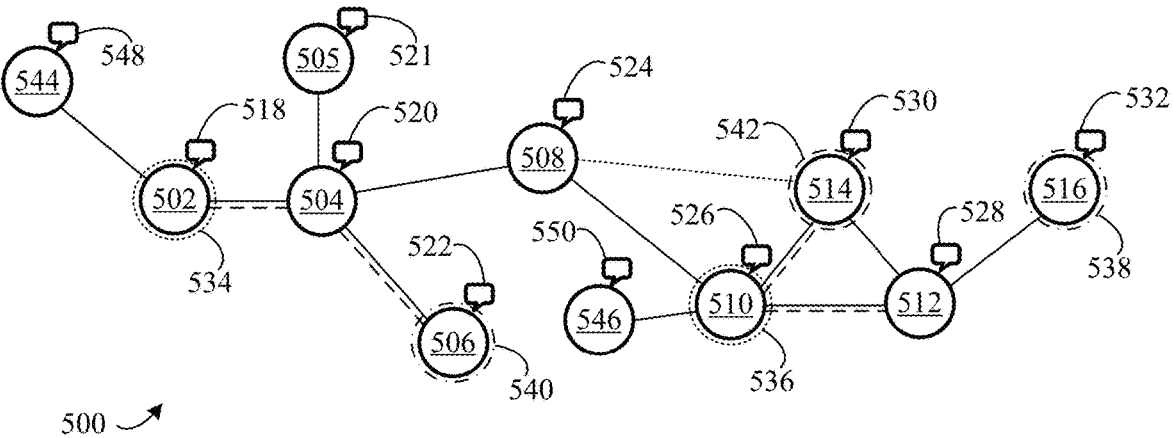
FIG. 5 shows a system graph of a computing system for context-aware security policies and incident identification via automated cloud graph building with security overlays, in accordance with an example embodiment.
Figure 6:
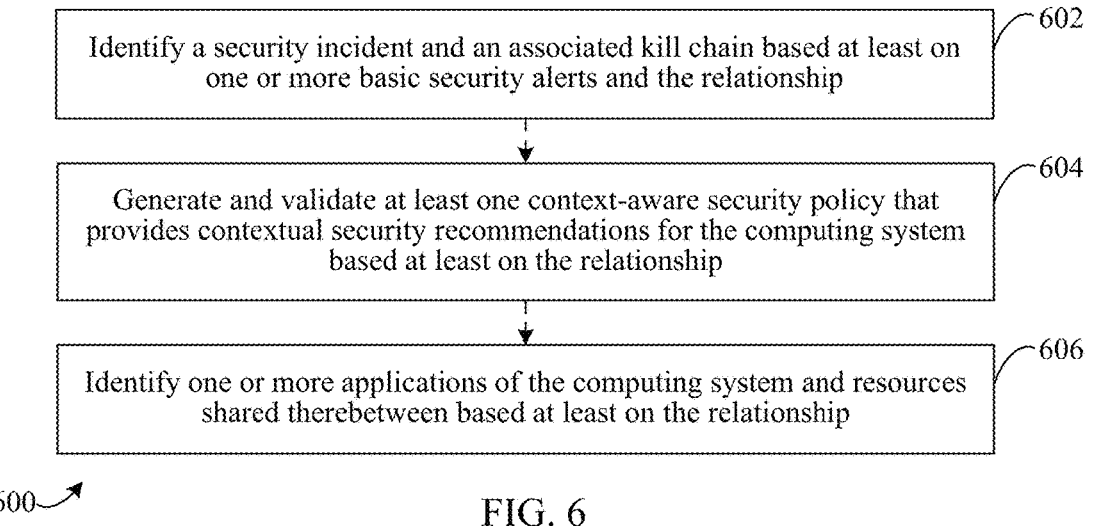
FIG. 6 shows a flowchart for context-aware security policies and incident identification via automated cloud graph building with security overlays, in accordance with an example embodiment.
Figure 7:
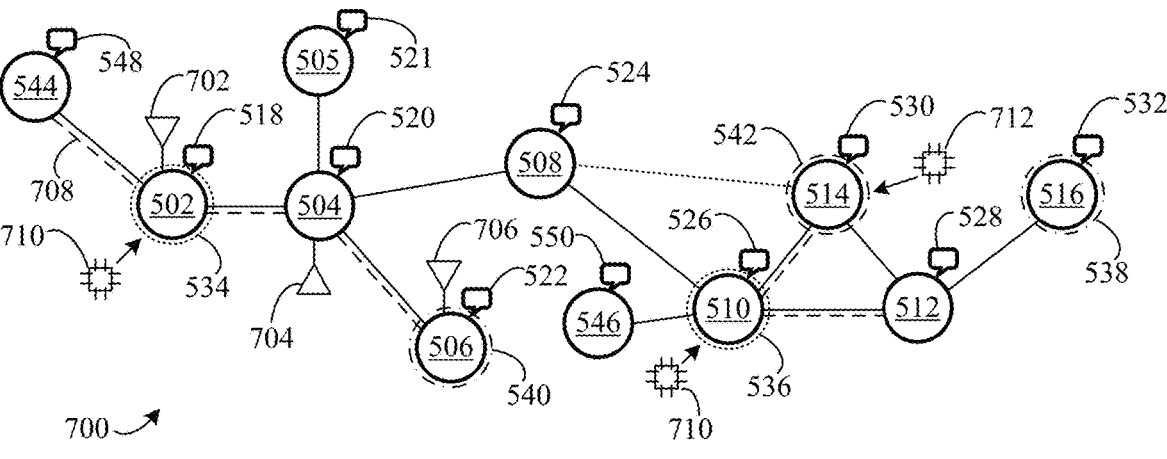
FIG. 7 shows a further example of the system graph of FIG. 5, in accordance with an embodiment.

FIG. 4 shows a flowchart 400, FIG. 5 shows a system graph ("graph") 500 of a computing system, FIG. 6 shows a flowchart 600, and FIG. 7 shows a system graph ("graph") 700 of a computing system (which is an embodiment of graph 500), each being for context-aware security policies and incident identification via automated cloud graph building with security overlays. Further structural and operational examples of embodiments will be apparent to persons skilled in the relevant art(s) based on the following descriptions.

Flowchart 400 begins at step 402. In step 402, graph nodes, of a graph associated with a computing system, are generated that represent resources associated with the computing system and entities associated with the computing system that have respective associations to the resources. For example, node generator 210 of graph engine 208 in system 200 of FIG. 2 may be configured to generate graph nodes for a graph, as in step 402. Graph nodes may be identified through a discovery of computing system resources (e.g., computing hardware, network hardware, data stores, secrets, VMs, subnets, virtual networks, network applications/services, and/or the like) and entities (e.g., sub-resources, identities, permission, user groups, users, tenants, and/or the like) may be identified for respective graph nodes in the graph via discovery.

Referring also now to FIG. 5, graph 500 includes a plurality of exemplary graph nodes of resources and entities for a computing system in the illustrated example: a graph node 502, a graph node 504, a graph node 505, a graph node 506, a graph node 508, a graph node 510, a graph node 512, a graph node 514, a graph node 516, a graph node 544, and a graph node 546, although more or fewer graph nodes may be present in any given graph. Node generator 210 in FIG. 2 is configured to generate the graph nodes listed here, in embodiments.

In the illustrated scenario, graph node 502 may represent a network adapter, associated with a first virtual network (not shown for illustrative clarity), which allows external connectivity to the computing system, graph node 504 may represent a first VM executing on a first server, graph node 505 may represent a first network application/service associated with the first VM, graph node 506 may represent a first data store associated with the first VM that stores first sensitive/confidential information, graph node 508 may represent a firewall between graph node 504 and graph node 510, graph node 510 may represent a network adapter, associated with a second virtual network (not shown for illustrative clarity), which allows external connectivity to the computing system, graph node 512 may represent a second VM executing on a second server, graph node 514 may represent a second network application/service associated with the second VM, graph node 516 may represent a second data store associated with the second VM that stores second sensitive/confidential information, graph node 544 may represent a first entity (that may be external to the computing system exemplarily represented by graph 500), and graph node 546 may represent a second entity.

Referring again to flow chart 400 of FIG. 4, in step 404, determined security attributes are assigned to respective graph nodes that represent the entities. For instance, with respect to FIG. 2, attribute manager of graph engine 208 may be configured to determine and assign security attributes for the graph nodes generated in step 402 of flowchart 400 above. In embodiments, one or more security attributes may be determined via respective monitors, e.g., monitor(s) 126 of cloud platform 112 in FIG. 1B, and as described herein. These security-related findings for, or insights to, the attributes for resources and entities represented by the graph nodes include, but are not limited to, recommendations on resources, alerts on resources, active users, vulnerabilities, sensitivity for data/information, and/or the like.

Referring back to FIG. 5, graph 500 includes a plurality of exemplary security attributes for the illustrated graph nodes of the computing system in the illustrated example: graph node 502 is associated with security attributes 518, graph node 504 is associated with security attributes 520, graph node 505 is associated with security attributes 521, graph node 506 is associated with security attributes 522, graph node 508 is associated with security attributes 524, graph node 510 is associated with security attributes 526, graph node 512 is associated with security attributes 528, graph node 514 is associated with security attributes 530, graph node 516 is associated with security attributes 532, graph node 544 is associated with security attributes 548, and graph node 546 is associated with security attributes 550, although more or fewer graph nodes may be present in any given graph. Attribute manager 212 in FIG. 2 may be configured to determine and assign the security attributes of the graph nodes listed here, in embodiments.

Additionally, in embodiments, attribute manager 212 may specifically denote certain types of attributes that could be associated with security risks. For instance, graph node 502 is shown with a dotted circle 534 that represents an outside connection to the computing system (i.e., a public interface); likewise, graph node 510 is shown with a dotted circle 536 that represents another outside connection to the computing system. Graph node 506 is shown with a dashed-dotted circle 540 that represents sensitive/confidential data and/or information therefor; likewise, graph node 516 is shown with a dashed-dotted circle 538 that represents sensitive/confidential data and/or information therefor. Further, graph node 514 is shown with a dashed circle 542 that represents a potential security vulnerability which may be determined based on software versions, outdated security policies, etc., identified in security attributes 530.

In step 406 of flowchart 400 in FIG. 4, static connections in the graph are generated between the graph nodes based at least on metadata of the entities and relationships between the entities. For example, static connector 214 of graph engine 208 in FIG. 2 is configured to generate static connections between graph nodes of graph 500. Static connector 214 may generate static connections, in embodiments, based on a knowledge-base of relations between entities/resources and metadata thereof, such as but not limited to, determining a virtual machine has a network interface, determining a network interface is associated with a subnet, determining a subnet is a part of a virtual net, determining a virtual net is peered to another virtual net, determining an identity has access to resource, etc.

Referring again to graph 500 and FIG. 5, a plurality of static connections are shown as solid lines between/connecting the graph nodes illustrated. As noted above herein, static connections may include established connections between the graph nodes.

In step 408 of flowchart 400 in FIG. 4, dynamic connections in the graph are generated between the graph nodes based at least on monitored communications between one or more of the resources. For example, dynamic connector 216 of graph engine 208 in FIG. 2 is configured to generate dynamic connections between graph nodes of graph 500. Dynamic connector 216 may generate dynamic connections, in embodiments, based on traffic detected by one or more monitors, as described herein. That is, dynamic connections between graph nodes may be generated based on the actual traffic monitored between the various resources, e.g., a monitor detects VM traffic and identifies connections to other resources, a monitor detects application/service traffic and identifies connections to other resources, a monitor detects storage traffic and identifies connections from other resources, and/or the like.

Referring again to graph 500 and FIG. 5, a plurality of dynamic connections are shown as dashed lines between/connecting the graph nodes illustrated. Dynamic connections are shown between graph node 502 and graph node 504, between graph node 504 and graph node 506, between graph node 510 and graph node 512, and between graph node 510 and graph node 514.

Step 410 of flowchart 400 in FIG. 4 may be optional in embodiments, and in some embodiments, step 410 may be performed prior to step 408 described above. In step 410, prior to the security action being performed, one or more possible connections in the graph are generated between the graph nodes based at least on at least one of configuration settings of the computing system or respective heuristic relational determinations of two or more of the graph nodes that include one or more of a graph node tag, a similarity, or a deployment template. For instance, possible connector 218 of graph engine 208 in FIG. 2 is configured to generate possible connections between graph nodes of graph 500. Possible connector 216 may generate possible connections, in embodiments, based on analyzing the environment of the computing system and the metadata of the entities/resources, e.g., based on a firewall configuration, it is possible that a resource can communicate with resources following the firewall (such as other virtual machines, web servers, etc.), as described herein. That is, dynamic connections between graph nodes may be generated based on configuration settings of the computing system.

Referring again to graph 500 and FIG. 5, a possible connection is shown as dotted line between/connecting graph node 508 (a firewall) and graph node 514 (a network application). In this example, the possible connection represents that graph node 504 (a VM executing on a server) behind graph node 508 (the firewall) may possibly connect to graph node 514 (a network application/service) because the firewall settings (e.g., determined from security attributes 524) do not expressly prevent or block such a possible connection, even though an established connection has not been made.

It should also be noted here that embodiment also contemplate possible connections between graph nodes based on respective heuristic relational determinations of two or more of the graph nodes that include one or more of a graph node tag, a similarity, or a deployment template. For instance, in an alternative embodiment for graph 500, graph node 508 may represent a network application or service that has the same application or service tag as the resource represented by graph node 514, which implies a possible connection between these graph nodes. Likewise, a similarity between resource represented by graph node 508 and graph node 514 and/or common/related deployment templates for these resources may imply a possible connection. In some embodiments, a possible connection may exist between two graph nodes that are not otherwise connected but that each have access to a common data store.

The embodiments herein also contemplate that a customer/user with a subscription to a network service (e.g., a cloud-based platform that hosts different applications and services) is enabled to query a graph of their subscription in the context of the processing system, e.g., for paths, and to receive reports and/or recommendations for informational purposes and/or actions.

FIG. 6 and FIG. 7 will also now be described in reference to FIG. 4 and FIG. 5. As noted, FIG. 6 shows a flowchart 600, and FIG. 7 shows a system graph ("graph") 700 of a computing system (which is an embodiment of graph 500). Flowchart 600 may be performed, at least in part, by priority engine 222 in FIG. 2. Graph 700 includes the components described above for graph 500 of FIG. 5, with the following additions: graph node 502 has a basic security alert 702, graph 504 has a basic security alert 704, graph 506 has a basic security alert 706, and an active connection 708 is denoted between graph node 544 and graph node 502. Additionally, a patch 710 is illustrated for graph node 502 and graph node 510, and a patch 712 is illustrated for graph node 514.

Referring now to FIG. 6 and flowchart 600, the step of which may be performed subsequent to step 408 and/or step 410 and prior to step 412 of flowchart 400, in embodiments. That is, prior to performing the security action (as described for step 412 of flowchart 400 below), one or more operations are performed in flowchart 600, the operations being the steps below. In some embodiments, one or more steps of flowchart 600 may be performed subsequent to step 412 of flowchart 400 and prior to step 412 being performed again. The steps of flowchart 600 are optional in embodiments where zero, one, two, or all steps may be performed. However, each step of flowchart 600 is described below for completeness.

In step 602, a security incident and an associated kill chain is identified based at least on one or more basic security alerts and the relationship between a set of the graph nodes of the graph. For example, incident manager 224 of priority engine 222 in FIG. 2 is configure to identify security incidents and their associated kill chains through the computing system. In embodiments, incident manager 224 identifies security incidents and kill chains through context of the computing system using the system graph and from basic security alerts from different resources therein.

For example, in reference to FIG. 7 and graph 700, monitors associated with the resource represented by graph node 502 may report a suspicious access from a public IP address associated with graph node 544 via basic alert 702, then monitors associated with the resource represented by graph node 504 may report a brute force attack from the public IP address on the VM and a suspicious process on the VM via basic alert 704, and then monitors associated with the resource represented by graph node 506 may report a suspicious login to the data store connected to the VM and data exfiltration from the database via basic alert 706. That is, these basic alerts are specific to the resources represented by graph node 502, graph node 504, and graph node 506, and in addition to not providing an overall context of the entire incident, the greater number of basic alerts leads to alert fatigue when each basic alert is treated individually. In the described embodiments, however, based on these basic alerts and the relationships and connections of the graph nodes provided in graph 700, incident manager 224 is configured to utilize this context of several resources, viewed together, to identify an overall security incident and the associated kill chain of actions between different graph nodes (or resources), which also alleviates alert fatigue, especially when many non-critical alerts are propagated on an alert thread for the system.

In step 604 of flowchart 600, at least one context-aware security policy that provides contextual security recommendations for the computing system is generated and validated based at least on the relationship. For instance, policy manager 226 may be configured to generate and validate context-aware security policies based at least on relationships of graph nodes in a graph, and embodiments provide that such policies are contextually insightful and non-localized regarding the entire computing system rather than being specific or localized to a given resource or a group of the same type of resources. As but one example, context-aware security policy is devised by policy manager 226, based on graph 700 and in embodiments also based on incidents and kill chains described above, that recommends to patch a vulnerability that is exploitable on a server that has a public interface and can connect to a data store with sensitive data/information, to fix all high- and medium-severity vulnerabilities on all resources that have a path to the sensitive data/information.

For example, in reference to FIG. 7 and graph 700, the generated context-aware security policy that provides the contextual security recommendation for the patch may be visualized as the application of patch 710 to both of graph node 502 and graph node 510, which allow external/public access to the computing system (denoted by dotted circle 534 and dotted circle 536). In other words, graph node 502, identified as the ingress point of the security incident described above, is recommended to be patched by applying patch 710 to prevent other similar incidents seeking data exfiltration from graph node 506. Likewise, graph node 510 has a path to graph node 506 (via graph node 508 and graph node 504), and accordingly, the contextual security recommendation for patch 710 is also applied to graph node 510. Additionally, in embodiments, graph node 514 may be patched via patch 712 based on the contextual security recommendation if the potential security vulnerability shown by dashed circle 542 represents a high- or medium-severity security risk.

In step 606 of flowchart 600, one or more applications of the computing system and resources shared therebetween are identified based at least on the relationship. For instance, app manager 228 may be configured to identify network application/service scopes and relationships therebetween, as well as resources shared between network applications/service, based on graph 700 and relationships between the graph nodes.

In FIG. 7, as one example, app manager 228 may identify that graph node 514 has a path to graph node 506 via graph node 510, graph node 508, and graph node 504, and a possible path, which is more direct and could possibly connect graph node 514 directly to graph node 508. Yet, it may be the case that graph node 504 has a security policy that does not allow graph node 514 to access graph node 506, and thus, graph node 514 is out of context, and the risk to data/information in graph node 506 from graph node 514 is of low-severity type of vulnerability which may be non-actionable (in contrast to actionable incidents resulting from vulnerabilities that allow for unauthorized accesses, processes, data exfiltration, etc.

In embodiments, performance of security actions for the computing system are also based at least on, and are also prioritized according to, one or more of the steps of flow-chart 600, described above.

Turning finally again to flowchart 400 of FIG. 4, in step 412, a security action is performed for the computing system based at least on a relationship between a set of the graph nodes of the graph. Action manager 220 of graph engine 208 in FIG. 2 may be configured to perform these security actions. In embodiments, the security actions may include, but are not limited to, providing contextual security recom-mendations, as exemplarily described for FIG. 6 and FIG. 7 above, applying patches, applying updates, etc. Recommen-dations may recommend applying patches/updates, chang-ing security setting or configurations of resources, altering permissions for identities/entities, and/or the like.

The results of the steps in flowchart 600 of FIG. 6 may be utilized by action manager 220 to prioritize security actions that are taken in step 412. For example, if a contextual security recommendation to apply patch 712 is related to an upgrade of software without any known high- or medium-severity risks, the action to recommend or patch for node 514 may be of a lower priority than recommending and applying patch 710 to graph node 502 and to graph node 510, which have been subject to an attack and associated data exfiltration. The security action for these graph nodes would thus be of a higher/highest priority.

III. Example Mobile and Computing Device Embodiments

Embodiments described herein may be implemented in hardware, or hardware combined with software and/or firm-ware. For example, embodiments described herein may be implemented as computer program code/instructions con-figured to be executed in one or more processors and stored in a computer readable storage medium. Alternatively, embodiments described herein may be implemented as hardware logic/electrical circuitry.

As noted herein, the embodiments described, including but not limited to, systems 100A and 100B of FIGS. 1A and 1B, respectively, and system 200 of FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hard-ware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, micropro-cessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illus-tration, and are not intended to be limiting. Embodiments may be implemented in further types of computer systems, as would be known to persons skilled in the relevant art(s).

Figure 8:
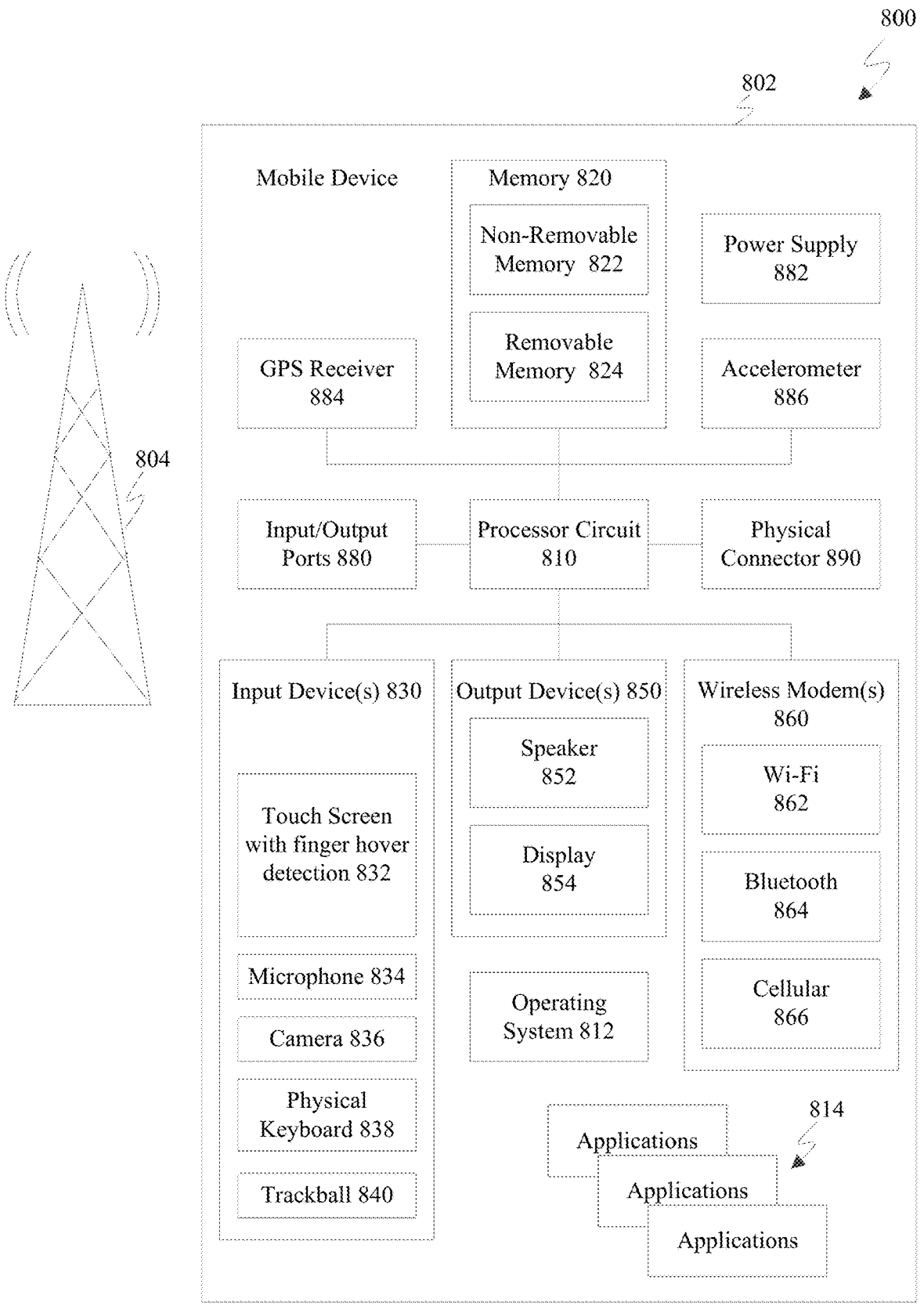
FIG. 8 shows a block diagram of an example mobile device that may be used to implement various example embodiments.

FIG. 8 is a block diagram of an exemplary mobile system 800 that includes a mobile device 802 that may implement embodiments described herein. For example, mobile device 802 may be used to implement any system, client, or device, or components/subcomponents thereof, in the preceding sections. As shown in FIG. 8, mobile device 802 includes a variety of optional hardware and software components. Any component in mobile device 802 can communicate with any other component, although not all connections are shown for ease of illustration. Mobile device 802 can be any of a variety of computing devices (e.g., cell phone, smart phone, handheld computer, Personal Digital Assistant (PDA), etc.) and can allow wireless two-way communications with one or more mobile communications networks 804, such as a cellular or satellite network, or with a local area or wide area network.

Mobile device 802 can include a controller or processor 810 (e.g., signal processor, microprocessor, ASIC, or other control and processing logic circuitry) for performing such tasks as signal coding, data processing, input/output pro-cessing, power control, and/or other functions. An operating system 812 can control the allocation and usage of the components of mobile device 802 and provide support for one or more application programs 814 (also referred to as "applications" or "apps"). Application programs 814 may include common mobile computing applications (e.g., e-mail applications, calendars, contact managers, web browsers, messaging applications) and any other computing applications (e.g., word processing applications, mapping applications, media player applications).

Mobile device 802 can include memory 820. Memory 820 can include non-removable memory 822 and/or removable memory 824. Non-removable memory 822 can include RAM, ROM, flash memory, a hard disk, or other well-known memory devices or technologies. Removable memory 824 can include flash memory or a Subscriber Identity Module (SIM) card, which is well known in GSM communication systems, or other well-known memory devices or technologies, such as "smart cards." Memory 820 can be used for storing data and/or code for running oper-ating system 812 and application programs 814. Example data can include web pages, text, images, sound files, video data, or other data to be sent to and/or received from one or more network servers or other devices via one or more wired or wireless networks. Memory 820 can be used to store a subscriber identifier, such as an International Mobile Sub-scriber Identity (IMSI), and an equipment identifier, such as an International Mobile Equipment Identifier (IMEI). Such identifiers can be transmitted to a network server to identify users and equipment.

A number of programs may be stored in memory 820. These programs include operating system 812, one or more application programs 814, and other program modules and program data. Examples of such application programs or program modules may include, for example, computer program logic (e.g., computer program code or instructions) for implementing one or more of systems 100A and 100B of FIGS. 1A and 1B, respectively, and system 200 of FIG. 2, along with any components and/or subcomponents thereof, as well as the flowcharts/flow diagrams described herein, including portions thereof, and/or further examples described herein.

Mobile device 802 can support one or more input devices 830, such as a touch screen 832, a microphone 834, a camera 836, a physical keyboard 838 and/or a trackball 840 and one or more output devices 850, such as a speaker 852 and a display 854. Other possible output devices (not shown) can include piezoelectric or other haptic output devices. Some devices can serve more than one input/output function. For example, touch screen 832 and display 854 can be combined in a single input/output device. In embodiments, mobile device 802 may include two or more physical instances of touch screen 832 and/or display 854. Input devices 830 can include a Natural User Interface (NUI).

One or more wireless modems 860 can be coupled to antenna(s) (not shown) and can support two-way communications between processor 810 and external devices, as is well understood in the art. Modem 860 is shown generically and can include a cellular modem 866 for communicating with the mobile communication network 804 and/or other radio-based modems (e.g., Bluetooth 864 and/or Wi-Fi 862). At least one wireless modem 860 is typically configured for communication with one or more cellular networks, such as a GSM network for data and voice communications within a single cellular network, between cellular networks, or between the mobile device and a public switched telephone network (PSTN).

Mobile device 802 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components of mobile device 802 are not required or all-inclusive, as any components can be deleted and other components can be added as would be recognized by one skilled in the art.

In an embodiment, mobile device 802 is configured to implement any of the above-described features of flowcharts herein. Computer program logic for performing any of the operations, steps, and/or functions described herein may be stored in memory 820 and executed by processor 810.

Figure 9:
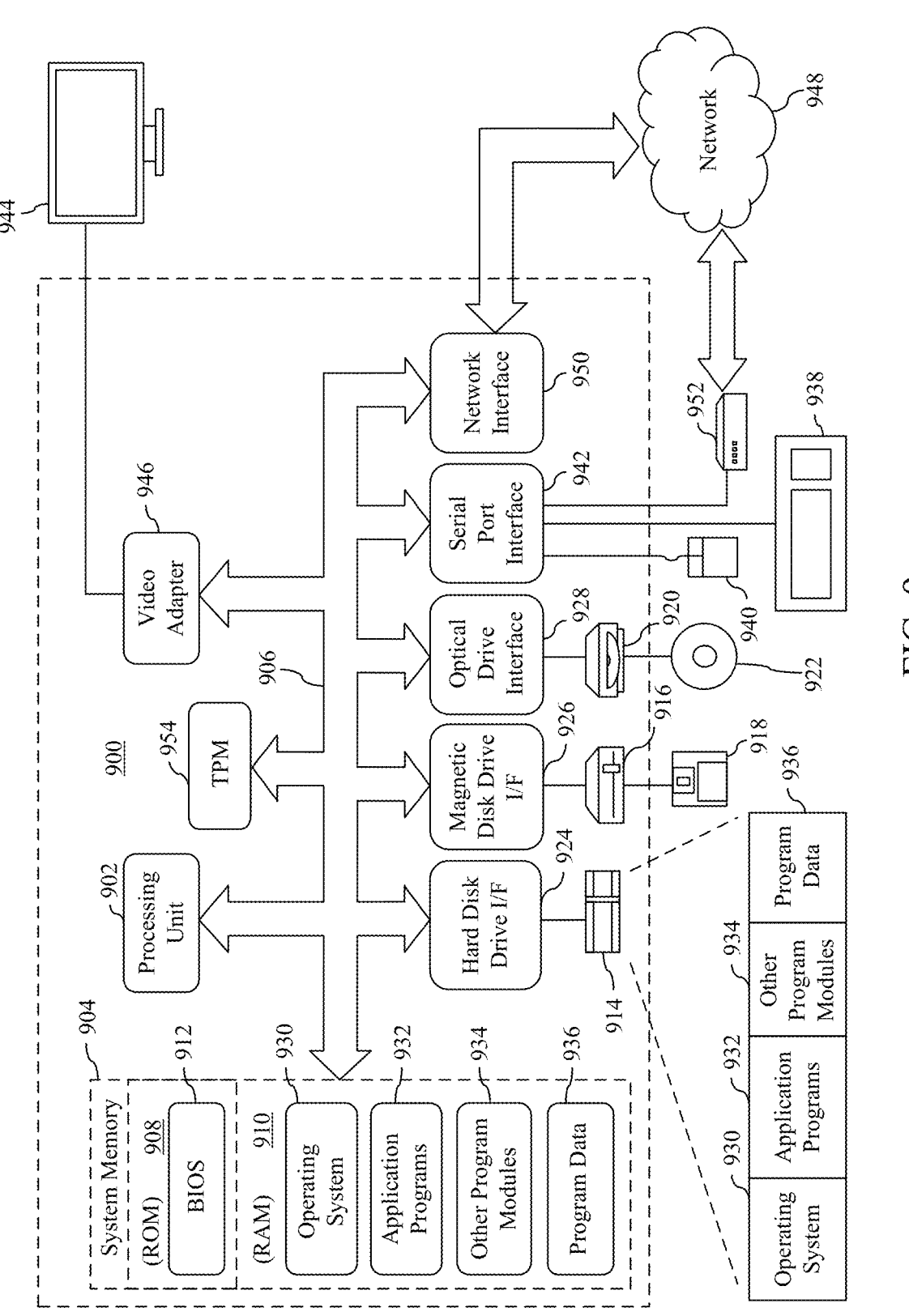
FIG. 9 shows a block diagram of an example computing device that may be used to implement embodiments.

FIG. 9 depicts an exemplary implementation of a computing device 900 in which embodiments may be implemented. For example, embodiments described herein may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems and/or game consoles, etc., as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing embodiments described herein, such as but not limited to, systems 100A and 100B of FIGS. 1A and 1B, respectively, and system 200 of FIG. 2, along with any components and/or subcomponents thereof, as well as the flowcharts/flow diagrams described herein, including portions thereof, and/or further examples described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

TPM 954 may be connected to bus 906, and may be an embodiment of any TPM, as would be understood by one of skill in the relevant art(s) having the benefit of this disclosure. For example, TPM 954 may be configured to perform one or more functions or operations of TPMs for various embodiments herein.

As used herein, the terms "computer program medium," "computer-readable medium," "computer-readable storage medium," "computer-readable storage media," "computer-readable storage device," and/or the like, are used to refer to physical hardware media. Examples of such physical hardware media include the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable media, computer-readable storage media, etc., are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for context-aware security policies and incident identification via automated cloud graph building with security overlays. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

Regarding sensitive/confidential data and information, embodiments provide for context-aware security policies that account for multiple resources/entities, different types thereof, communication paths thereof, security attributes thereof, etc., that allow for policy implementation in the context of larger portions of computing systems, or computing systems in their entireties, rather than simply for individual or similar resources.

Accordingly, context-aware security policies herein, e.g., for data stores having sensitive/confidential data and information, may be generated and validated to provide a standard security tiers for subscription levels, and for any resource communicating (e.g., bi-directionally) with the data store, and resources communicating with such data stores, according to the context-aware security policies, are recommended to fix any high- and medium-severity failed assessments (e.g., for network applications/services, virtual networks, subnets, VMs, database servers, etc.).

Because of the contextually-aware nature of these security policies, given the graphs described herein for computing systems, the security policies take the overall processing system into account for recommendations and actions. Further, the graphs of computing systems provided in the embodiments herein take external entities into account, e.g., devices/systems associated with public IP addresses that can connect to the computing systems via public access points.

Additionally, the embodiments herein allow for extensible graphing and analysis from both sides: i.e., additional inputs and/or data feeds, including heuristic information, that may be provided via application programming interfaces (APIs) in the computing system in developing graphs as well as additional system conditions, real-time information, additional back-end tools for graph-related operations, etc., can both be utilized.

Prior solutions at best utilize monitoring for individual or similar resources (e.g., via tagging), but fail to address different contexts that exist with the overall computing systems and fail intelligently automate security overlays and additional security findings for system graphs to provide the contextual insights enabled through the described embodiments. In contrast, the embodiments herein utilize computing system-wide graphs that enable contexts above and beyond prior solutions: system graphs that provide graph nodes for each resource and entity of the processing system, different types of connections therebetween (including possible connections), automatically generated security overlays, heuristically determined characteristics of resources and entities, etc., that enable a greater understanding of computing systems that improves security policy generation and implementation, as well as security incident identification, in an extensible way. These and other improvements described herein for context-aware security policies and incident identification via automated cloud graph building with security overlays were previously not available for software-based platform and networks, much less for the specific system implementations, organizations, and architectures in the embodiments described herein.

The additional examples and embodiments described in this Section may be applicable to examples disclosed in any other Section or subsection of this disclosure.

Embodiments in this description provide for systems, devices, and methods for context-aware security policies and incident identification via automated cloud graph building with security overlays. For instance, such a system is described herein. The system includes a memory that stores program code, and a processing system, comprising one or more processors, configured to receive the program code from the memory and, in response to at least receiving the program code, to perform operations. The operations include to: generate graph nodes, of a graph associated with a computing system, that represent resources associated with the computing system and entities associated with the computing system that have respective associations to the resources; assign determined security attributes to respective graph nodes that represent the entities; generate static connections in the graph between the graph nodes based at least on metadata of the entities and relationships between the entities; generate dynamic connections in the graph between the graph nodes based at least on monitored communications between one or more of the resources; and perform a security action for the computing system based at least on a relationship between a set of the graph nodes of the graph.

In an embodiment of the system, the program code is configured to perform the security action for the computing system also based at least on a plurality of respective security alerts overlaid on the graph nodes; and the relationship is determined based at least on one or more of graph node connections, a graph traversal, or a neighborhood analysis.

In an embodiment of the system, the static connections comprise at least one of existing connections or available connections; and the processing system, in response to at least receiving the program code, is configured to: generate, prior to the security action being performed, one or more possible connections in the graph between the graph nodes based at least on at least one of: configuration settings of the computing system, or respective heuristic relational determinations of two or more of the graph nodes that include one or more of a graph node tag, a similarity, or a deployment template.

In an embodiment of the system, the processing system, in response to at least receiving the program code, is configured to, prior to the program code performing the security action, perform one or more operations of: identify a security incident and an associated kill chain based at least on one or more basic security alerts and the relationship; generate and validate at least one context-aware security policy that provides contextual security recommendations for the computing system based at least on the relationship; or identify one or more applications of the computing system and resources shared therebetween based at least on the relationship. In the embodiment, the program code is configured to perform the security action for the computing system also based at least on, and is also prioritized according to, the one or more operations.

In an embodiment of the system, the computing system comprises a cloud platform that includes a plurality of virtual networks; each of the plurality of virtual networks includes respective ones of the graph nodes; and the processing system, in response to at least receiving the program code, is configured to: generate and validate at least one context-aware security policy that provides a contextual security recommendation for at least two of the plurality of virtual networks of the computing system based at least on the relationship.

In an embodiment of the system, at least one of the entities is another computing system external to the cloud platform.

In an embodiment of the system, the resources associated with the computing system include computing hardware, network hardware, a data store that includes sensitive information, one or more permissions, and at least one of a virtual machine, a network application, a group of users, or a user.

A method performed by a processing system is also described herein. The method includes: generating graph nodes, of a graph associated with a computing system, that represent resources associated with the computing system and entities associated with the computing system that have respective associations to the resources; assigning determined security attributes to respective graph nodes that represent the entities; generating static connections in the graph between the graph nodes based at least on metadata of the entities and relationships between the entities; generating dynamic connections in the graph between the graph nodes based at least on monitored communications between one or more of the resources; and performing a security action for the computing system based at least on a relationship between a set of the graph nodes of the graph.

In an embodiment of the method, performing the security action for the computing system is also based at least on a plurality of respective security alerts overlaid on the graph nodes; and the relationship is determined based at least on one or more of graph node connections, a graph traversal, or a neighborhood analysis.

In an embodiment of the method, the static connections comprise at least one of existing connections or available connections; and the method includes: generating, prior to the security action being performed, one or more possible connections in the graph between the graph nodes based at least on at least one of: configuration settings of the computing system, or respective heuristic relational determinations of two or more of the graph nodes that include one or more of a graph node tag, a similarity, or a deployment template.

In an embodiment, the method includes at least one of: identifying a security incident and an associated kill chain based at least on one or more basic security alerts and the relationship; generating and validating at least one context-aware security policy that provides contextual security recommendations for the computing system based at least on the relationship; or identifying one or more applications of the computing system, and resources shared therebetween based at least on the relationship; and performing the security action for the computing system is also based at least on, and is also prioritized according to, the one or more operations.

In an embodiment of the method, the computing system comprises a cloud platform that includes a plurality of virtual networks; and each of the plurality of virtual networks includes respective ones of the graph nodes; and the method further includes: generating and validating a context-aware security policy that provides a contextual security recommendation that applies to at least two of the plurality of virtual networks of the computing system based at least on the relationship.

In an embodiment of the method, at least one of the entities is another computing system external to the cloud platform.

In an embodiment of the method, the resources associated with the computing system include computing hardware, network hardware, a data store that includes sensitive information, one or more permissions, and at least one of a virtual machine, a network application, a group of users, or a user.

At least one computer readable storage medium having program code recorded thereon that, when executed by at least one processing system, perform a method, is also described. The method includes: generating graph nodes, of a graph associated with a computing system, that represent resources associated with the computing system and entities associated with the computing system that have respective associations to the resources; assigning determined security attributes to respective graph nodes that represent the entities; generating static connections in the graph between the graph nodes based at least on metadata of the entities and relationships between the entities; generating dynamic connections in the graph between the graph nodes based at least on monitored communications between one or more of the resources; and performing a security action for the computing system based at least on a relationship between a set of the graph nodes of the graph.

In an embodiment of the at least one computer readable storage medium, in the method, performing the security action for the computing system is also based at least on a plurality of respective security alerts overlaid on the graph nodes; and the relationship is determined based at least on one or more of graph node connections, a graph traversal, or a neighborhood analysis.

In an embodiment of the at least one computer readable storage medium, the static connections comprise at least one of existing connections or available connections; and the method further includes: generating, prior to the security action being performed, one or more possible connections in the graph between the graph nodes based at least on at least one of: configuration settings of the computing system, or respective heuristic relational determinations of two or more of the graph nodes that include one or more of a graph node tag, a similarity, or a deployment template.

In an embodiment of the at least one computer readable storage medium, the method includes at least one of: identifying a security incident and an associated kill chain based at least on one or more basic security alerts and the relationship; generating and validating at least one context-aware security policy that provides contextual security recommendations for the computing system based at least on the relationship; or identifying one or more applications of the computing system, and resources shared therebetween based at least on the relationship. In the embodiment, performing the security action for the computing system is also based at least on, and is also prioritized according to, the one or more operations.

In an embodiment of the at least one computer readable storage medium, the computing system comprises a cloud platform that includes a plurality of virtual networks; each of the plurality of virtual networks includes respective ones of the graph nodes; and the method further includes: generating and validating a context-aware security policy that provides a contextual security recommendation that applies to at least two of the plurality of virtual networks of the computing system based at least on the relationship.

In an embodiment of the at least one computer readable storage medium, at least one of the entities is another computing system external to the cloud platform; or the resources associated with the computing system include computing hardware, network hardware, a data store that includes sensitive information, one or more permissions, and at least one of a virtual machine, a network application, a group of users, or a user.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system comprising:
a processor; and
a memory device that stores program code structured to cause the processor to:
   generate a graph of a cloud platform that includes a plurality of virtual networks, the graph including graph nodes representing resources and entities of the cloud platform, the entities having respective associations to the resources, a first virtual network of the virtual networks including at least one of the graph nodes;
   assign determined security attributes to the graph nodes of the graph that represent the entities;
   generate dynamic connections in the graph between the graph nodes based at least on monitored communications between one or more of the resources, the monitored communications including monitored traffic between the one or more of the resources; and
   generate a context-aware security policy that provides a contextual security recommendation for the first virtual network and a second virtual network of the virtual networks based at least on relationships of the graph.

2. The system of claim 1, wherein the program code is further structured to cause the processor to:
perform a security action for the cloud platform based at least on a relationship between a set of the graph nodes of the graph.

3. The system of claim 2, wherein to perform the security action, the program code is further structured to cause the processor to:
perform the security action also based on a plurality of respective security alerts overlaid on the graph nodes of the graph.

4. The system of claim 2, wherein, prior to the program code performing the security action, the program code is further structured to cause the processor to at least one of:
identify a security incident and an associated kill chain based at least on one or more basic security alerts and the relationship;

generate and validate at least one context-aware security policy that provides contextual security recommendations for the cloud platform based at least on the relationship; or identify one or more applications of the cloud platform and resources shared therebetween based at least on the relationship; and wherein the program code is further structured to cause the processor to perform the security action for the cloud platform based further at least on, and prioritized according to, the one or more operations.

5. The system of claim 1, wherein to generate the context-aware security policy, the program code is further structured to:

generate the context-aware security policy to provide the contextual security recommendation for the first and second virtual networks based at least on a relationship between the first and second virtual networks represented in the graph.

6. The system of claim 1, wherein at least one of the entities is a computing system external to the cloud platform.

7. The system of claim 1, wherein the program code is further structured to cause the processor to:

generate static connections in the graph between the graph nodes based at least on metadata of the entities and relationships between the entities.

8. A method, comprising:

generating a graph of a cloud platform that includes a plurality of virtual networks, the graph including graph nodes representing resources and entities of the cloud platform, the entities having respective associations to the resources, a first virtual network of the virtual networks including at least one of the graph nodes;

assigning determined security attributes to the graph nodes of the graph that represent the entities;

generating dynamic connections in the graph between the graph nodes based at least on monitored communications between one or more of the resources, the monitored communications including monitored traffic between the one or more of the resources; and generating a context-aware security policy that provides a contextual security recommendation for the first virtual network and a second virtual network of the virtual networks based at least on relationships of the graph.

9. The method of claim 8, further comprising:

performing a security action for the cloud platform based at least on a relationship between a set of the graph nodes of the graph.

10. The method of claim 9, wherein said performing comprises:

performing the security action also based on a plurality of respective security alerts overlaid on the graph nodes of the graph.

11. The method of claim 9, further comprising:

prior to performing the security action, performing to at least one of:

identifying a security incident and an associated kill chain based at least on one or more basic security alerts and the relationship;

generating and validating at least one context-aware security policy that provides contextual security recommendations for the cloud platform based at least on the relationship; or identifying one or more applications of the cloud platform and resources shared therebetween based at least on the relationship; and wherein the security action is performed for the cloud platform based further at least on, and prioritized according to, the one or more operations.

12. The method of claim 8, wherein said generating the context-aware security policy comprises:

generating the context-aware security policy to provide the contextual security recommendation for the first and second virtual networks based at least on a relationship between the first and second virtual networks represented in the graph.

13. The method of claim 8, wherein at least one of the entities is a computing system external to the cloud platform.

14. The method of claim 8, further comprising:

generating static connections in the graph between the graph nodes based at least on metadata of the entities and relationships between the entities.

15. A computer readable storage medium having program code recorded thereon that, when executed by a processor, performs a method comprising:

generating a graph of a cloud platform that includes a plurality of virtual networks, the graph including graph nodes representing resources and entities of the cloud platform, the entities having respective associations to the resources, a first virtual network of the virtual networks including at least one of the graph nodes;

assigning determined security attributes to the graph nodes of the graph that represent the entities;

generating dynamic connections in the graph between the graph nodes based at least on monitored communications between one or more of the resources, the monitored communications including monitored traffic between the one or more of the resources; and generating a context-aware security policy that provides a contextual security recommendation for the first virtual network and a second virtual network of the virtual networks based at least on relationships of the graph.

16. The computer readable storage medium of claim 15, wherein the method further comprises:

performing a security action for the cloud platform based at least on a relationship between a set of the graph nodes of the graph.

17. The computer readable storage medium of claim 16, wherein said performing comprises:

performing the security action also based on a plurality of respective security alerts overlaid on the graph nodes of the graph.

18. The computer readable storage medium of claim 16, further comprising:

prior to performing the security action, performing to at least one of:

identifying a security incident and an associated kill chain based at least on one or more basic security alerts and the relationship;

generating and validating at least one context-aware security policy that provides contextual security recommendations for the cloud platform based at least on the relationship; or identifying one or more applications of the cloud platform and resources shared therebetween based at least on the relationship; and wherein the security action is performed for the cloud platform based further at least on, and prioritized according to, the one or more operations.

19. The computer readable storage medium of claim 15, wherein said generating the context-aware security policy comprises:

generating the context-aware security policy to provide the contextual security recommendation for the first and second virtual networks based at least on a relationship between the first and second virtual networks represented in the graph.

20. The computer readable storage medium of claim 15, wherein at least one of the entities is a computing system external to the cloud platform.

\* \* \* \* \*